Dec. 14, 1954  F. H. MUELLER ET AL  2,696,966
PIPE LINE STOPPER
Filed July 19, 1951  3 Sheets-Sheet 1
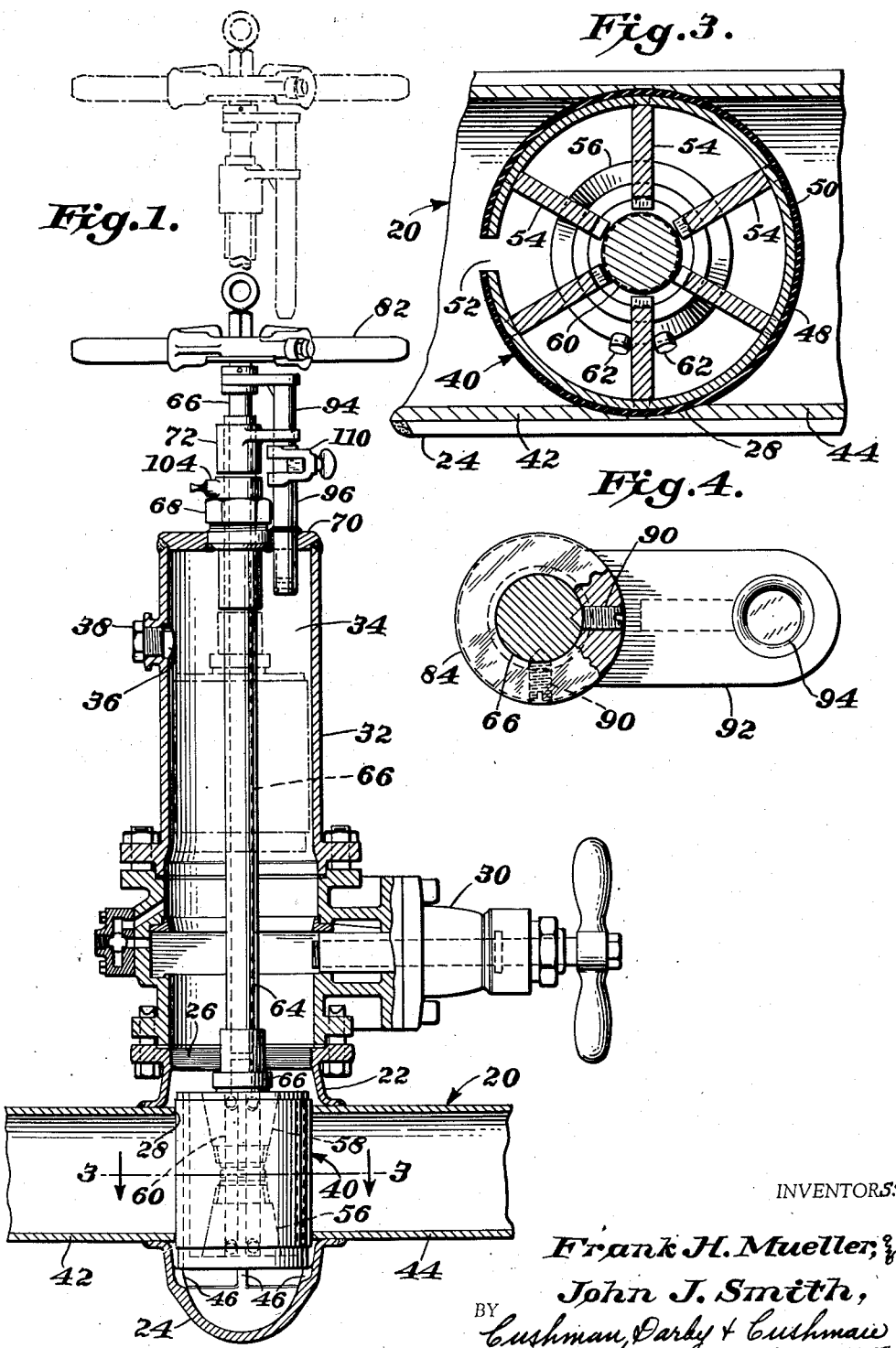
INVENTORS:
Frank H. Mueller,
John J. Smith,
BY Cushman, Darby & Cushman
ATTORNEYS.

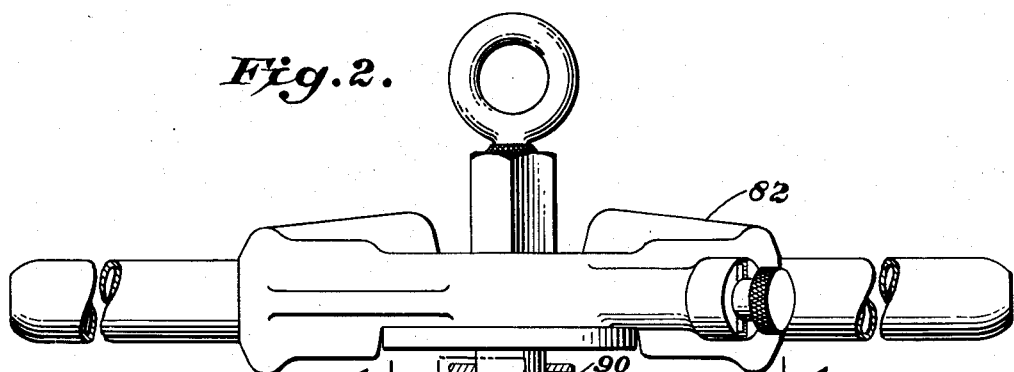
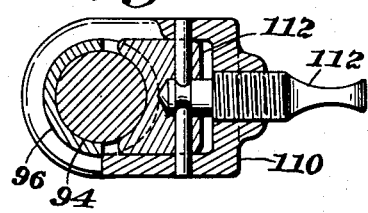
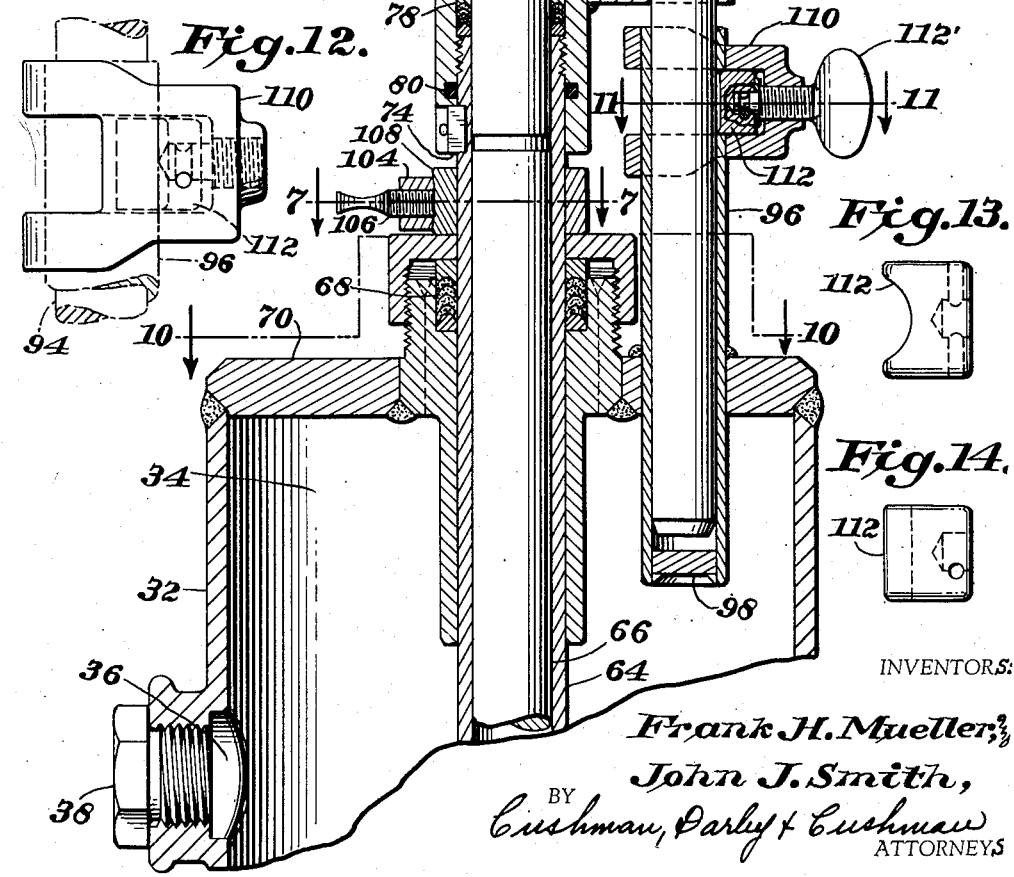

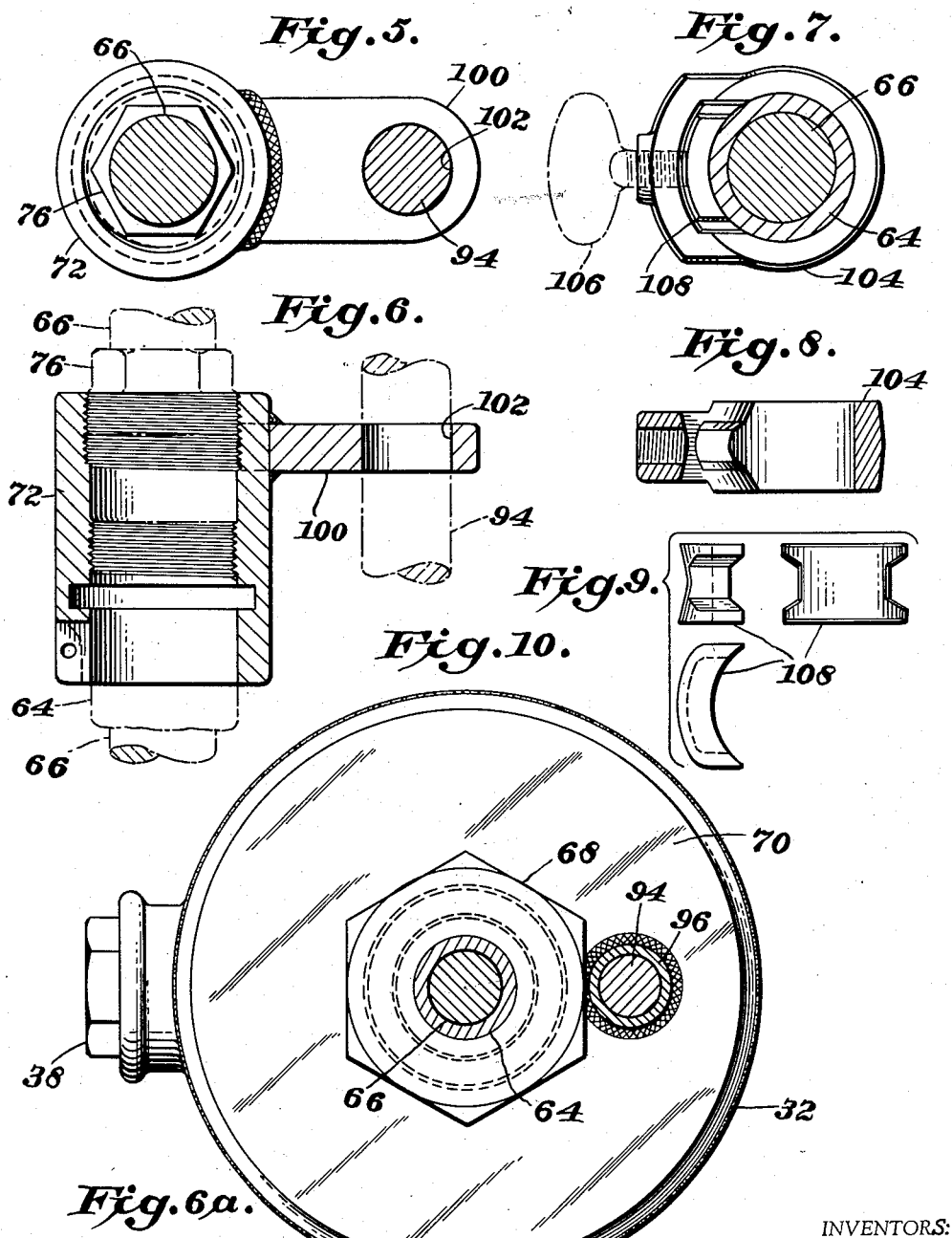

United States Patent Office 2,696,966
Patented Dec. 14, 1954

2,696,966

PIPE LINE STOPPER

Frank H. Mueller and John J. Smith, Decatur, Ill., assignors to Mueller Co., Decatur, Ill., a corporation of Illinois Application July 19, 1951, Serial No. 237,556

8 Claims. (Cl. 251—167)

This invention relates to a pipe stopper of the expanding plug type which is adapted to be inserted in a transverse circular cut-out portion of a pipe and expanded to stop the flow of fluid therethrough. More particularly, this invention relates to mechanism for inserting and positioning an expansible pipe stopper of the type having a side opening therein adapted to be positioned on the upstream or pressure side of the line to admit fluid into the stopper and into the stopper bell. Such admission of fluid serves both to assist in expanding the stopper and to permit by-passing of the fluid from the line through the stopper bell and into a by-pass connection. Pipe stoppers of the type with which this invention is concerned and which employ a longitudinally slotted expansible sleeve for the stopper body are shown and described more in detail in the copending applications of Edgar A. Koenig, Serial No. 638,865, filed January 3, 1946, now abandoned, and of John J. Smith, Serial No. 236,108, filed July 11, 1951, now Patent No. 2,655,339.

The stoppers disclosed in the aforementioned copending applications comprise a longitudinally slit flexible cylindrical sleeve having a pair of frusto-conical wedging elements disposed on the interior thereof. These elements cooperate with complementary tapered surfaces on the sleeve for a mutual wedging action that is effective to expand the sleeve into sealing relationship with the edges of the cut-out portion of the pipe. Opposite axial movement of the conical wedging elements is accomplished by mounting them on a jackscrew having two sets of threads of opposite pitch. An extension of the jackscrew, or expanding rod, extends through the top of the stopper bell for rotation by a hand wheel, or other suitable rotating means, to expand and to permit contraction of the split sleeve. In stopping position, the slot in the side of the sleeve is presented to the upstream or pressure side of the line so that fluid entering therein will assist in expanding the sleeve and also flow through the stopper and into the bell. Obviously, a suitable connection to the bell will then serve to by-pass fluid from the line to any desired point. In order to correctly orient the sleeve with the slot positioned on the upstream side of the line, an orienting tube is connected to the stopper body concentrically over the expanding rod, or jackscrew extension, and extends through the closed end of the bell for connection to appropriate positioning means. Additionally, the orienting tube serves as a means for holding the stopper body against rotation while the expanding wedges are operated to either expand or permit contraction of the sleeve.

Insertion and withdrawal of the stopper into and from the line and orientation within the latter can be effectively accomplished by the operating mechanism shown in the aforementioned copending applications. With such mechanism it is possible, however, to position the stopper so that the slot in the sleeve is positioned on the downstream side of the line. Additionally, the mechanism shown in said applications provides no means for maintaining the stopper in its retracted position within the bell prior to connection of the latter to the main. Moreover, under relatively high pressure conditions, line pressure tends to maintain the stopper in its withdrawn position and to move the same into such position after insertion of the stopper into the line but prior to expansion thereof to shut off the flow. No means are shown in the aforementioned copending applications for holding the stopper in the line during rotation of the expanding rod, by a hand wheel or the like, to expand the same into shut-off condition. Accordingly, it has been found to be rather difficult to rotate the hand wheel to expand the stopper and simultaneously to exert an axial force on the hand wheel to maintain the stopper within the line while it is being expanded.

It is, therefore, an object of this invention to provide an improved inserting and positioning mechanism for an expansible pipe stopper having a side opening therein for positioning on the upstream or pressure side of the line.

It is another object of this invention to provide an improved orienting mechanism for a pipe stopper of the type described, which mechanism positively positions the side opening in the stopper on the upstream or pressure side of the line.

It is still another object of this invention to provide a pipe stopper of the type described with simple means for maintaining the stopper in retracted position within the stopper bell.

It is still another object of this invention to provide a pipe stopper of the type described with means for holding the stopper firmly within the line during expansion thereof by a hand wheel, or other appropriate means.

It is a further object of this invention to provide an improved inserting and orienting mechanism for a pipe line stopper of the type under consideration.

Other objects and advantages of the invention will be evident from the following description and the accompanying drawings, in which:

Figure 1 is an elevational sectional view showing a pipe liner stopper embodying this invention operatively associated with the line and in stopping position therein. The dotted lines show the position of the stopper, and the operating mechanism therefor, when withdrawn from the line into the stopper bell.

Figure 2 is an enlarged detail fragmentary view corresponding to Figure 1.

Figure 3 is an enlarged sectional view taken on line 3—3 of Figure 1.

Figures 4 and 5 are sectional views taken on the corresponding numbered section lines of Figure 2.

Figure 6 is an enlarged detail fragmentary view corresponding to Figure 2 of an element shown therein.

Figure 6a is a fragmentary elevational view of a portion of the element shown in Figure 6 and taken from the left-hand side of such figure.

Figure 7 is a sectional view taken on line 7—7 of Figure 2.

Figure 8 is an enlarged sectional view of one of the elements shown in Figure 7.

Figure 9 includes plan, elevational, and side views of another of the elements shown in Figure 7.

Figure 10 is a sectional view taken on line 10—10 of Figure 2.

Figure 11 is a sectional view taken on line 11—11 of Figure 2.

Figure 12 is an elevational view of one of the elements shown in Figure 11.

Figures 13 and 14 are plan and elevational views, respectively, of another of the elements shown in Figure 11.

Referring now to the drawings, there is shown in Figure 1 a section of a pipe line 20 having conventional upper and lower fittings 22 and 24 for tapping the line, welded or otherwise suitably secured thereto. The upper fitting 22 is provided with a flanged opening 26 disposed in alignment with a transverse circular bore or cut-out 28 previously drilled through the pipe, such bore being of a diameter at least slightly greater than the inside diameter of the pipe 20. Connected to the upper fitting 22 is a control valve 30, usually of the gate type as shown, and secured to the gate valve is a conventional stopper barrel or bell 32 defining an interior pressure chamber 34 and having a radial outlet port 36 on one side thereof which may be closed by a plug 38. The purpose of this outlet port 36 will be described later. An expansible pipe stopper 40, of the type with which this invention is concerned, is shown in expanded position within the cut-out portion 28 of the pipe line 20 to stop the flow of fluid from pipe section 42 to pipe section 44. A plurality of lugs 46 are arranged within the lower fitting 24 for engagement with the stopper 40 to properly position the latter axially within the transverse cut-out portion 28 of the pipe 20.

The stopper comprises a cylindrical sleeve 48, preferably of rather springy material such as sheet steel or the like, having a flexible covering 50 of rubber or other suitable sealing material to provide an effective seal against the edges of the cut-out portion 28 of the pipe. The sleeve 48 is split to form a longitudinal slot 52, as shown in Figure 3, and is constructed so that, when relaxed, the sleeve is of slightly smaller exterior diameter than that of the cut-out portion or transverse opening 28 through the pipe. The sleeve 48 is provided with a plurality of circumferentially spaced, inwardly extending radial vanes 54 having tapered end portions. Engaged with the tapered portions of the vanes 54 are a pair of frusto-conical wedging elements 56 and 58 threadedly mounted on a jackscrew 60. The threads engaging each of the wedging elements 56 and 58 are of opposite pitch, so that when the wedging elements are held against rotation, rotation of the jackscrew 60 in one direction serves to move the elements toward each other to expand the sleeve 48. Rotation of the jackscrew 60 in the opposite direction obviously serves to relieve the wedging action of the frusto-conical elements 56 and 58 and thereby permit contraction of the sleeve 48 to its normal diameter because of its inherent resilient nature.

A pair of radial pins 62 (see Figure 3) are mounted on each of the wedging elements 56 and 58 in position to straddle one of the sleeve vanes 54 so that when one of the wedging elements is held against rotation, both the sleeve 48 and the other element are similarly held against rotation. The means for holding one of the wedging elements against rotation consists of an orienting tube 64 which is connected by a coupling ring 66 to an axially extending annular collar on the upper element 58 and has a slot and tooth engagement therewith for preventing relative rotation therebetween. The tube 64 concentrically encloses an expanding rod 66, or operating extension of the jackscrew 60, and both extend upwardly through a suitable stuffing box 68 in the closed end 70 of the stopper bell 32 for operation by appropriate exterior means. The construction thus far described is disclosed more in detail in the aforementioned copending application of John J. Smith.

The projecting end of the orienting tube 64 terminates short of the end of the jackscrew extension 66 and has an interiorly threaded sleeve 72 threaded to the end thereof and keyed thereto as by means of a key element 74. The outer end of the sleeve 72 is also interiorly threaded for reception of a gland nut 76 to compress packing 78 interposed between the sleeve 72 and the jackscrew extension 66. When necessary, the contacting smooth surfaces of the sleeve 72 and the tube 64 may be annularly grooved for reception of a suitable O-ring type of sealing material 80. Thus, any leakage of line pressure between the bell 32 and the tube 64, and between the tube 64 and the jackscrew extension 66, is effectively prevented.

The outer end of the jackscrew extension 66 is provided with manually operable means, such as the handled ratchet device 82 shown in the drawings, for rotating the jackscrew 60 in either direction. A pair of spaced collars 84 and 86 are mounted on the jackscrew extension 66 between the ratchet device 82 and the sleeve 72. One of these collars 86 abuts against a shoulder 88 formed on the jackscrew extension and the other collar 84 is spaced from the collar 86 and fixed to the extension by means of set screws 90. Rotatably mounted on the jackscrew extension 66 between the two collars 84 and 86 is a radial lug 92 having one end of a bar 94 secured to the outer end thereof. The bar 94 extends parallel to the jackscrew extension 66 toward the stopper bell 32. Mounted on the closed end 70 of the stopper bell and extending therethrough into the pressure chamber 34 is a tubular guiding member 96 having a closed inner end 98. The tubular member 96 essentially forms a well to telescopingly receive the free end of the bar 94. The sleeve 72 also has a radial lug 100 thereon which is provided with an opening 102 aligned with the bar 94 and has the latter passing therethrough.

From this construction it will be evident that relative axial movement between the tube 64 and the jackscrew extension 66 is possible and also that the jackscrew extension is freely rotatable in either direction by means of the ratchet device 82. Rotation of the orienting tube 64 relative to the bell 32 is not possible, however, when the bar 94 is positioned within the tubular guiding member 96. The tubular member 96 is so positioned on the stopper bell 32 that when the bar 94 is engaged therein the longitudinal slot 52 in the stopper sleeve 48 is presented to the upstream side of the line 20. It will also be noted that when the stopper 40 is inserted into the transverse cut-out portion 28 of the line, the end of the bar 94 projects through the closed end 70 of the stopper bell. Hence, the stopper 40 cannot be completely inserted into the line 20, unless the tube 64 is oriented to position the bar 94 within the tubular member 96. It is thus evident that it is impossible to incorrectly orient the tube 64 and position the stopper 40 in any angular position within the line save that in which the slot 52 faces the upstream or pressure side of the line.

Mounted on the orienting tube 64 between the stuffing box 68 and the sleeve 72 is a clamping ring 104 having a radial thumb screw 106 that bears against a radially movable element 108 interposed between the exterior of the tube 64 and the inner end of the thumb screw 106. Tightening of the thumb screw 106 will thus serve to firmly secure the ring 104 to the tube 64. It will also be evident that the thumb screw 106 may be loosened and the ring 104 moved to any desired longitudinal location along the tube 64. Thus, when the stopper 40 is withdrawn into the stopper bell 32, the ring 104 may be moved to abut against the top of the stuffing box 68 and the thumb screw 106 retightened, thus serving to maintain the stopper within the stopper bell.

The outer end of the tubular guiding element 96 has a yoke member 110 secured thereto provided with a radial thumb screw 112'. Swivelly connected to the inner end of the thumb screw 112' and bearing against the side of the bar 94, through a slot in the side wall of the tube 96, is a clamping element 112. It will be obvious that by tightening the thumb screw 112' the bar 94 will be locked against axial movement relative to the tubular element 96. Hence, it is possible to lock the stopper 40 against axial movement in any position along its axial path of travel.

In operation of the improved stopper inserting and positioning mechanism, after the pipe 20 has been cut out, the valve 30 closed, and the drilling machine (not shown) removed, the stopper 40 is withdrawn into the bell 32, the clamping ring 104 abutted against the top of the stuffing box 68, and the thumb screw 106 tightened to maintain the stopper in this position, as shown in dotted lines in Figure 1. The stopper bell 32 is then bolted, and/or otherwise suitably secured in correctly oriented position on the gate valve 30 and the latter then opened. The clamp ring 104 is then loosened and axial force applied to the handles of the ratchet device 82 to push the stopper 40 out of the bell 32 through the valve 30 and into the transverse bore 28 through the pipe 20 where the stopper 40 is correctly longitudinally positioned by engagement with the aligning lugs 46 in the lower fitting 24, as shown in Figure 1. The locking thumb screw 112' is then tightened to hold the stopper 40 in this position while the ratchet device 82 is manually rotated to expand the stopper and stop the flow of fluid from pipe section 42 to pipe section 44. During such expansion, upstream line pressure passes through the slot 52 in the sleeve 48 and acts on the interior of the latter to aid in expanding the same tightly against the edges of the cut-out portion 28 of the pipe. Such line pressure also passes upwardly through the sleeve 48, through the valve 30, and into the pressure chamber 34, from whence such line pressure may be diverted to any suitable location by means of a by-pass connection to the radial port 36.

In order to contract the stopper 40 and withdraw the same from the line, the ratchet device 82 is first operated in the reverse direction to relieve the wedging effect of the wedging elements 56 and 58 and permit the stopper sleeve 48 to spring back to its original diameter. The locking thumb screw 112' is then loosened to permit the ratchet device 82 to be lifted to withdraw the stopper 40 from the line 20 through the valve 30 and into the pressure chamber 34 of the stopper bell 32. The clamping ring 104 is then abutted against the top of the stuffing box 68 and its thumb screw 106 tightened to prevent descent of the stopper out of the bell. The valve 30 may then be closed and, if no further stopping operations are necessary, the stopper bell 32 disconnected and removed therefrom.

It will thus be seen that the objects of this invention have been both fully and effectively accomplished by an improved stopper inserting and orienting mechanism. It will be realized, however, that the specific embodiment used to illustrate this invention is susceptible to various changes and modifications which retain the basic principles of the invention. Therefore, this invention includes all embodiments and modifications encompassed by the spirit and scope of the following claims.

We claim:

1. An inserting and positioning assembly for an expansible pipe stopper adapted to be inserted into a transverse bore in a line and having internal expanding means operable by a rotatable expanding rod concentrically enclosed by a positioning tube secured against relative movement to the stopper body, said assembly comprising: a stopper bell adapted to be secured radially to a line and having the tube, and enclosed expanding rod, extending in sealed relation and for axial and rotary movement through the closed end thereof; fixed guide means on said bell offset laterally from the tube; and rigid means fixed against rotation to the outer end of the tube exteriorly of said bell and slidably engaging said guide means for maintaining the stopper against rotation, and oriented in a particular angular position within the line.

2. The structure defined in claim 1 including clamping means associated with the guide means and the rigid means for adjustably securing both said means against relative movement longitudinally of the rod and tube.

3. The structure defined in claim 1 in which the stopper has a side opening for positioning on the pressure side of the line and the guide means and rigid means are angularly positioned with respect to the side opening to maintain the same on the pressure side of the line.

4. The structure defined in claim 1 in which the guide means comprises a well in the closed end of the stopper bell and the rigid means comprises a rod snugly receivable in said well.

5. An inserting and positioning assembly for an expansible pipe stopper adapted to be inserted into a transverse bore in a line and having a side opening for positioning on the pressure side of a line, internal expanding means operable by a rotatable operating rod for expanding and contracting the stopper, and an orienting tube secured against relative movement to the stopper body and concentrically enclosing the rod for angularly positioning the stopper in the transverse bore, said assembly comprising: a stopper bell adapted to be secured radially to a line and having the orienting tube, and enclosed expanding rod, extending in sealed relation and for axial movement through the closed end thereof; sleeve means fixed to the projecting outer end of the tube and sealingly embracing an outwardly projecting portion of the rod; a radial lug on said sleeve having an opening therethrough parallel to the sleeve axis; a radial lug rotatably mounted on the projecting outer end of the rod; a bar affixed to said rod lug and extending parallel to the rod and tube through said tube lug aperture; and socketed guide means on said bell for snugly receiving the free end of said bar in order to maintain the stopper in angular position to present the side opening therein to the pressure side of the line.

6. An inserting and positioning assembly for an expansible pipe stopper adapted to be inserted into a transverse bore in a line and having a side opening for positioning on the pressure side of the line and internal expanding means operable by a rotatable expanding rod concentrically enclosed by an orienting tube secured against relative movement to the stopper body, said assembly comprising: a stopper bell adapted to be secured radially to a line and having the orienting tube, and enclosed expanding rod, extending for axial movement through a stuffing box on the closed end thereof; a sleeve keyed to the outer end of the tube and having a packing gland for sealing relationship with a projecting portion of the rod; a radial lug on said sleeve having an opening therethrough spaced from and parallel to the sleeve axis; and a pair of telescopingly associated elongated members disposed parallel to the axis of the tube and rod, one rotatably connected to the projecting end of the rod and extending through said lug aperture and the other fixed to said bell, said members being telescoped one within the other and being angularly oriented with respect to said bell to position the side opening in the stopper on the pressure side of the line.

7. The structure defined in claim 6 in which the member fixed to the bell is tubular for reception of the other member therein and including clamping means on said tubular member for adjustably holding said members against relative movement.

8. A pipe stopper assembly comprising: a stopper body for insertion into a transverse bore in a line and having a longitudinally-slotted expansible sleeve, wedge means for expanding said sleeve, and rotatable means for operating said wedge means; a stopper bell adapted to be secured radially to a line; an expanding rod connected to said rotatable means; an orienting tube concentrically enclosing said expanding rod and connected to said stopper body against relative movement, said tube and rod extending in sealed relationship and for axial and rotary movement through the closed end of said bell; fixed guide means on said bell; and rigid means fixed against rotation to the outer end of said tube and slidably engaging said guide means for maintaining said stopper body both in angular position to present the slot in said sleeve to the pressure side of the line and fixed against rotation while the rod is rotated.

References Cited in the file of this patent

UNITED STATES PATENTS

| Number | Name | Date |
|---|---|---|
| 880,674 | Ladd | Mar. 3, 1908 |
| 2,237,476 | Cline | Apr. 8, 1941 |
| 2,425,483 | Mueller | Aug. 12, 1947 |